United States Patent [19]

Makinen et al.

[11] Patent Number: 4,672,277

[45] Date of Patent: Jun. 9, 1987

[54] ELEVATOR MOTOR CONTROL

[75] Inventors: Heimo Makinen; Matti Kahkipuro, both of Hyvinkaa, Finland

[73] Assignee: Elevator GmbH, Baar, Switzerland

[21] Appl. No.: 680,314

[22] Filed: Dec. 10, 1984

[51] Int. Cl.⁴ .................. H02P 3/14; B66B 1/32
[52] U.S. Cl. .................... 318/380; 318/381; 318/370; 363/37; 187/120
[58] Field of Search .......... 318/345 G, 345 C, 370, 318/373, 374, 375, 376, 377, 380, 381, 800–806, 86, 87, 88, 741, 743, 744, 757, 758, 759, 760, 294; 363/27, 37, 51, 128, 129; 187/29 R, 29

[56] References Cited

U.S. PATENT DOCUMENTS

| | | | |
|---|---|---|---|
| 3,296,512 | 1/1967 | Meyer et al. | 318/376 X |
| 3,584,281 | 6/1971 | Reeves | 318/284 X |
| 3,660,738 | 5/1972 | Anderson et al. | 318/375 X |
| 3,890,551 | 6/1975 | Plunkett | 318/376 |
| 3,917,029 | 11/1975 | Maynard | 187/29 R |
| 4,039,914 | 8/1977 | Steigerwald et al. | 318/375 |
| 4,093,900 | 6/1978 | Plunkett | 318/370 |
| 4,104,571 | 8/1978 | Gurwicz et al. | 318/375 |
| 4,259,714 | 3/1981 | Zander | 363/37 |
| 4,275,341 | 6/1981 | Huber et al. | 318/375 X |
| 4,281,375 | 7/1981 | Pouillange | 363/37 |
| 4,386,299 | 5/1983 | Pham | 318/375 X |
| 4,386,305 | 5/1983 | Kohzai et al. | 318/571 |
| 4,414,619 | 11/1983 | Kahkipuro | 363/160 X |
| 4,423,363 | 12/1983 | Clark et al. | 318/375 |
| 4,426,610 | 1/1984 | Kawada et al. | 318/806 X |
| 4,484,664 | 11/1984 | Nomura | 187/29 R |
| 4,503,938 | 3/1985 | Nomura | 187/29 R |
| 4,521,724 | 6/1985 | Sakamoto et al. | 318/757 X |

FOREIGN PATENT DOCUMENTS

| | | |
|---|---|---|
| 449750 | 4/1968 | Switzerland . |
| 1071841 | 6/1967 | United Kingdom . |
| 1326140 | 8/1973 | United Kingdom . |

Primary Examiner—William M. Shoop, Jr.
Assistant Examiner—Shik Luen Paul Ip
Attorney, Agent, or Firm—Bell & Arkin

[57] ABSTRACT

A method and apparatus for controlling a direct current motor of an elevator during emergency braking by conducting a current generated by the motor through a braking resistor are disclosed, in which a semiconductor switch connects the braking resistor across the motor during the emergency braking and a mains voltage to the motor is simultaneously interrupted.

11 Claims, 2 Drawing Figures

ELEVATOR MOTOR CONTROL

BACKGROUND OF THE INVENTION

The present invention relates to a procedure and means for controlling the d.c. motor of an elevator in an emergency braking, in which a current generated by the motor of the elevator during emergency braking is conducted into a braking resistance.

During emergency braking of an elevator, the braking proper, i.e. deceleration of the elevator cage, has to be managed as independently as possible of the other systems of the elevator. In the case of a d.c. motor, in some countries and in some cases provisions have been enacted on safety considerations prescribing that the elevator motor shall be electrically braked, whereby it will operate as a generator. This is usually accomplished by connecting a separate braking resistance across the motor during emergency braking and at the same time interrupting the power supply to the motor. In other cases, the entire braking takes place by the aid of a mechanical brake exclusively. By braking in this manner, the travelling velocity of the elevator will naturally also be retarded independently of external factors.

As a rule, the connecting of the braking resistance is so accomplished that during emergency braking the power supply of the motor is automatically cut off and the brake resistance is connected across the motor. This arrangement, however, suffers from the drawback that a contactor which connects the brake resistance across the motor is necessarily a component of rare quality and high price, owing to the heavy direct currents generated by the motor. The contactor is special particularly for the reason that it is required to carry a heavy current in the deenergized state. Standard contactors, in contrast, carry heavy currents in the energized state.

It is accordingly an object of the present invention to eliminate this drawback.

SUMMARY OF THE INVENTION

This and other objects of the invention are accomplished in accordance with the principles of the present invention by providing an elevator emergency braking system comprising an elevator motor and a braking resistor for connection across the motor during an emergency braking situation, with means for detecting the occurrence of the emergency braking system, a semiconductor switch actuatable in response to the detection of the emergency braking situation for effecting the connection of the braking resistor across the motor, and means for simultaneously interrupting the application of a mains voltage to the motor.

In a preferred embodiment of the invention, the semiconductor switch comprises at least one thyristor adapted to be fired by the detecting means, and means are provided for applying a voltage across the poles of the motor to the thyristor for effecting the firing of the thyristor. Also, a three-phase contactor means directly responsive to the detecting means is provided for effecting the interruption of the mains voltage to the motor.

For controlling a direct current motor of an elevator during emergency braking by conducting a current generated by the motor through a braking resistor, the invention provides a method comprising the steps of utilizing a semiconductor switch to connect the braking resistor across the motor during the emergency braking and simultaneously interrupting the application of a mains voltage to the motor. The step of connecting the braking resistor across the motor comprising detecting the emergency braking and, in response to the detection of the emergency braking, utilizing a voltage across the poles of the motor to fire at least one thyristor forming part of the semiconductor switch. A three-phase contactor is actuated in response to the detection of the emergency braking to effect the interruption of the application of the mains voltage to the motor.

There are several semiconductors developed for various purposes, which are inexpensive standard products and tolerate very heavy currents. By using elements of this kind for connecting the braking resistor, the drawbacks encumbering mechanical contactors are completely avoided.

Thyristors constitute a large group of power electronics components for which the interrupting of heavy currents by external low voltage control is one of the most typical applications. This switching mode has the further advantage that the thyristor that has to be switched has no separate power source for establishing the ignition energy when the voltage across the poles of the motor is employed. Thus when, for instance, the three-phase supply mains fail, the emergency braking of the motor still functions, whereas the equipment would fail in the event that a conventional mains-supplied thyristor ignition were used.

The three-phase contactor need not have high power tolerating capacity because it is provided in a three-phase a.c. supply, where the average power transmitted by each contactor element is only a fraction of the rated values of the motor, and because the contactor is used only in emergency braking situations. In the preferred embodiment the three-phase contactor and a relay for detecting the emergency braking situation may for instance consist of one contactor component.

The means applying the procedure of the invention, consisting of a circuit which connects a braking resistance across the elevator motor in the event of emergency braking, is mainly characterized in that when the member sensing the emergency braking becomes activated the braking resistance is connected across the motor by means of a semiconductor switch known in itself in the art, at the same time as the main voltage supplying the motor drive is disconnected.

An advantageous embodiment of the means of the invention is characterized in that the semiconductor switch consists of at least one thyristor ignitable by the aid of a member such as a relay, sensing the emergency braking.

An advantageous embodiment of the means of the invention is also characterized in that the ignition voltage switched on by the relay consists of the voltage between the poles of the motor.

An advantageous embodiment of the means of the invention is also characterized in that the member sensing the emergency braking acts directly, such as mechanically or electromechanically, on the three-phase contactor disconnecting the main voltage.

BRIEF DESCRIPTION OF THE DRAWINGS

The invention is described more in detail in the following by the aid of an example, reference being made to the drawing attached, wherein.

DETAILED DESCRIPTION OF THE DRAWINGS

Figure 1:
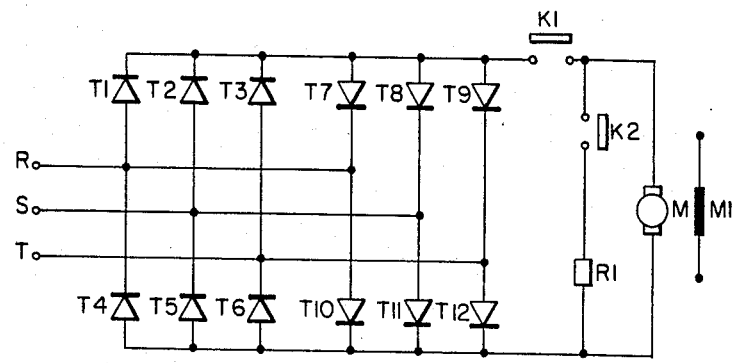
FIG. 1 presents a prior art circuit for switching on the braking resistance.

In the prior art circuit shown in FIG. 1, thyristors T1 through T12, connected as a thyristor bridge, form a four-quadrant static converter for converting a three-phase mains voltage (RST) into direct current, which is applied to a direct current motor M.

During emergency braking, a contactor K1, is opened to interrupt the power supply to the motor M and simultaneously a contactor K2 is closed to connect a brake resistor R1 in parallel with the motor M, whereby the motor functions as a generator and supplies electricity to its load, that is, to the resistor R1. By suitable selection of the value of the resistor R1, the motor can be braked in a desired manner. The magnetizing circuit of the motor has been indicated by reference M1.

Figure 2:
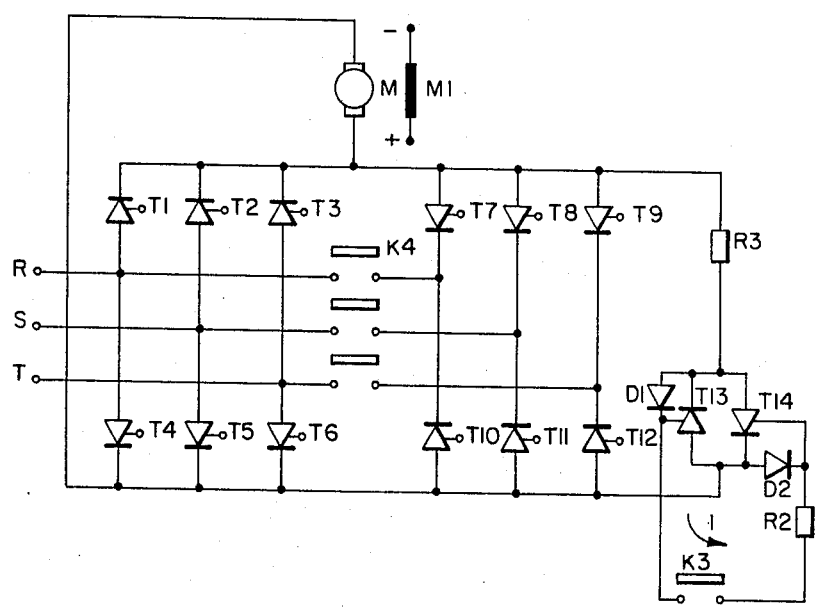
FIG. 2 presents the procedure of the invention for switching on the braking resistance.

A d.c. motor control circuit for the emergency braking of an elevator in accordance with the present invention is shown in FIG. 2, in which components corresponding to those of FIG. 1 have been indicated by like references.

As in the foregoing, a four-quadrant static converter of a type well known to those skilled in the art and formed by a plurality of thyristors T1 to T12 is used for conversion of the main voltage (RST) to direct current. The contactor K1 has been replaced by a standard type threephase contactor K4, which has been placed in the circuit before the thyristor bridge performing the rectification, that is, in the mains supply RST. More particularly, the contactor K4 is connected so that the short circuit paths of the thyristor bridges are interrupted when the contactor K4 is open. Such a short circuit path is, for instance, that from the R phase to the S phase through T1 and T8. This provides a short circuit path for the energy supplied by the mains. A separate short circuit path exists for the energy supplied by the motor.

The contactor K2 has been replaced in this figure by a semiconductor switch which consists of thyristors T13 and T14, diodes D1 and D2 connected to constitute a grid control circuit for the thyristors, an auxiliary resistor R2 and an emergency braking sensing contactor K3.

The two thyristors T13 and T14 are connected in opposition so that the polarity of the motor does not have any effect on the operability of the system. It will thus be understood that only one of the thyristors T13 and T14, one of the diodes D1 and D2, and the auxiliary resistor R2 and the relay contact K3 are indispensable components. The illustrated and described circuit, however, has the important advantage that the motor may be connected one way or the other without jeopardizing the operability of the emergency braking control.

The operation of the motor control system depicted in FIG. 2 during emergency braking is as follows:

When the contactor K3 closes during emergency braking, a part of the motor current, I, is enabled to flow (with the polarity as shown in the figure) through the diode D1 and the auxiliary resistor R2 to the grid of the thyristor T14, which thereby is fired and opens a path for the motor current to flow through braking resistor R1.

The braking resistor R1 has by this switching process being connected in parallel with the motor M.

Simultaneously, the three-phase contactor K4 opens, whereby the potential short circuit paths of the motor, e.g. that by the path M-T7-T4-M, are interrupted. The current generated by the motor is then enabled to discharge only through the braking resistor R1, until after the emergency has passed and the contactor K3 is opened and the contactor K4 is again closed.

As mentioned hereinabove, an emergency braking operation as taught by the invention, in which the firing pulses for the thyristors T13 and T14 are taken from the poles of the direct current motor M, is also operative when the main voltage has failed. In general, a prerequisite for emergency braking is, however, the existence of magnetization for the motor, implying that in the present instance the magnetization connection M1 of the motor has to be such as to provide a sufficiently long time constant for the magnetizing current dissipation, e.g. in the event of mains failure. Such a principle of magnetization circuits is however well known in the art.

It is obvious to a person skilled in the art that various embodiments of the invention are not exclusively confined to the example presented in the foregoing but may vary within the scope of the claims to be presented below.

We claim:

1. A method of controlling a direct current motor of an elevator during emergency braking by conducting a current generated by said motor through a braking resistor, said method comprising the steps of:
    applying a voltage generated by said direct current motor during the emergency braking to the grid of a thyristor to switch the latter to a conductive state;
    utilizing the conductive state of said thyristor to connect said braking resistor continuously across said direct current motor in response to said voltage during the emergency braking; and
    simultaneously interrupting the application of a mains voltage to said motor.

2. A method as claimed in claim 1, in which the step of connecting said braking resistor across said motor comprising detecting the emergency braking and, in response to the detection of the emergency braking, utilizing a voltage across the poles of said motor to fire at least one thyristor forming part of said semiconductor switch.

3. A method as claimed in claim 2, which includes actuating a three-phase contactor, in response to the detection of the emergency braking, to effect the interruption of the application of the mains voltage to said motor.

4. In an elevator emergency braking system comprising an elevator direct current motor, a braking resistor for connection across said direct current motor during an emergency braking situation, and means for conducting a current generated by said direct current motor through said braking resistor during emergency braking, the improvement comprising, in said conducting means:
    thyristor means for effecting a continuous connection of said braking resistor across said direct current motor when said thyristor means is in a conductive state;
    means for applying a voltage generated by said direct current motor during the emergency braking to the grid of said thyristor means to switch the latter to its conductive state; and contactor means for simultaneously continuously interrupting the application of a mains voltage to said direct current motor.

5. An elevator emergency braking system as claimed in claim 4, wherein said semiconductor switch means comprises at least one thyristor adapted to be fired by said detecting means.

6. An elevator emergency braking system as claimed in claim 5, including means for applying a voltage across the poles of said motor to said thyristor for effecting the firing of said thyristor.

7. An elevator emergency braking system as claimed in claim 4, wherein said thyristor means comprise first and second thyristors connected with opposite polarities for conducting the current generated by said direct current motor through said braking resistor, whereby such conduction is effected irrespective of the direction of rotation of said direct current motor.

8. An elevator emergency braking system as claimed in claim 4, further comprising four quadrant static converter means for rectifying a three phase a.c. supply and applying a rectified direct current to said motor for driving said motor, said contactor means comprising a three-phase contactor means for closing short circuit paths in said converter means and thereby interrupting the supply of the rectified direct current to said motor.

9. An elevator emergency braking system as claimed in claim 5, further comprising four quadrant static converter means for rectifying a three-phase a.c. supply and applying a rectified direct current to said motor for driving said motor, said contactor means comprising a three-phase contactor means for closing short circuit paths in said converter means and thereby interrupting the supply of the rectified direct current to said motor.

10. An elevator emergency braking system as claimed in claim 6, further comprising four quadrant static converter means for rectifying a three-phase a.c. supply and applying a rectified direct current to said motor for driving said motor, said contactor means comprising a three-phase contactor means for closing short circuit paths in said converter means and thereby interrupting the supply of the rectified direct current to said motor.

11. An elevator emergency braking system as claimed in claim 7, wherein first and second diodes are connected in series with said braking resistor between said direct current motor and the grids of respective ones of said first and second thyristors for applying a firing current from said direct current motor to the grid of a respective one of said thyristors during the emergency braking.

* * * * *